Patented Feb. 27, 1945

2,370,518

UNITED STATES PATENT OFFICE 2,370,518

MANUFACTURE OF ORGANIC NITROSYL CHLORIDE ADDITION PRODUCTS

Herman A. Beekhuis, Jr., Petersburg, Va., assignor to The Solvay Process Company, New York, N. Y., a corporation of New York No Drawing. Application January 19, 1942,
Serial No. 427,345

9 Claims. (Cl. 260—647)

This invention relates to the manufacture of nitrosyl chloride addition products of organic compounds containing a non-aromatic ethylenic linkage.

The nitrosyl chloride addition products prepared from such unsaturated compounds are believed to comprise largely organic nitroso chloro compounds having the chlorine atom and nitroso group upon adjacent carbon atoms; the isomeric oximes; the chloro derivatives formed by substitution of chlorine for a remaining hydrogen of the nitroso-substituted carbon of the nitroso chloro compounds; and dimers of the nitroso chloro compounds. A considerable proportion of these products may react further under the conditions of nitrosation to lose nitrogen and form products such as alpha-chlorohydrins and alpha-chloro-ketones.

The nitrosyl chloride addition products (herein termed "nitrosyl chloride adducts") are useful intermediates for the manufacture of sulfonates by reaction with alkali-metal sulfites, ammonium sulfites, or alkali-metal thiosulfates, for the manufacture of phosphonates by reaction with phosphites, for the manufacture of arsonates by reaction with arsenites, and for the manufacture of other types of addition products formed by reaction of the nitrosyl chloride adducts with such compounds as taurine salts, salts of N-methyl taurine, pyridine, and thiocyanates. They may be reduced or aminated to form amines.

The nitrosyl chloride adducts are of particular utility for the formation of sulfonates by reaction with alkali-metal or ammonium sulfites (sulfitation) as described and claimed in United States Patent 2,265,993. The sulfitation products prepared from unsaturated organic compounds containing one or two non-aromatic ethylenic groups and containing between 10 and 20 carbon atoms per ethylenic group and having at least 8 carbon atoms disposed as a continuous carbon chain, are especially suitable as detergents, wetting agents, emulsifying agents and the like.

In accordance with the present invention nitrosyl chloride adducts of organic compounds containing at least one non-aromatic C=C linkage are prepared by reacting the unsaturated compound with nitrosyl chloride containing an oxide of the group consisting of nitrogen trioxide and nitrogen tetroxide.

The presence of the nitrogen oxide has been found to substantially improve the yield of nitrosyl chloride adduct formed in the process. Thus by employing as nitrosating agent for the nitrosation of an olefin, a nitrosyl chloride containing between 4 and 8 mols per cent of nitrogen tetroxide, $N_2O_4$, the yield of product convertible to sulfitation product may be increased by 10% to 20% over the yield obtainable without the nitrogen tetroxide. The sulfitation products so prepared are no darker in color than products prepared without the nitrogen oxides. A higher proportion of nitrogen oxide still further increases the yield; however the products in this case may be darker in color than the products obtained using the smaller proportions of the nitrogen oxide. In place of nitrogen tetroxide, the trioxide, $N_2O_3$, or a mixture of the trioxide and tetroxide or a mixture of nitric oxide and nitrogen tetroxide may be used. Most satisfactory results, however, seem to be obtained with the tetroxide.

The process of the present invention may be conducted in the presence or, in the case of liquids, in the absence of inert non-aqueous solvents for the unsaturated organic compound or the nitrosyl chloride.

The process may be carried out by introducing the nitrosyl chloride either as a liquid or as a gas and at temperatures from below zero up to 80° C. At low temperatures the reaction proceeds relatively slowly, however, and at high temperatures the product formed is frequently contaminated with dark-colored impurities which discolor the adduct.

It is preferred to introduce the nitrosyl chloride nitrogen oxide mixture into an agitated solution of the unsaturated compound in a suitable organic solvent maintained at a reaction temperature between 0° C. and 25° C.

The introduction of nitrosyl chloride may be continued until part or substantially all of the non-aromatic C=C bonds have reacted. Normally between about 1¼ and about 4 mols of the nitrosyl chloride-nitrogen oxide mixture passed into the reaction vessel per C=C linkage, depending upon the compound treated and the experimental conditions, will suffice to react substantially all of the unsaturated organic compound; up to 2 mols of the nitrosyl chloride-nitrogen oxide mixture may react with the unsaturated compound depending upon conditions, and any remaining dissolved at the end of nitrosation may be removed by aeration. Passage of an excess of nitrosyl chloride-nitrogen oxide mixture serves to maintain a reasonable reaction rate in the later stages of attack by providing a high concentration of nitrosating agent when the olefin concentration is becoming low. Also, there is some loss of the nitrous gases in side reactions. In most cases it is desirable to effect relatively complete reaction of the C=C bonds, but in some cases it may be preferable to limit nitrosation to a lower degree; for example, in the production of detergents from unsaturated compounds containing more than one non-aromatic C=C linkage and less than 10 carbon atoms per unsaturated linkage, nitrosation may be limited to advantage to restrict the number of unsaturated linkages reacted to provide in the product at least 10 carbon atoms per reacted unsaturated linkage.

Olefins and their carboxylic derivatives (such as unsaturated carboxylic acids and their esters, salts, amides, chlorides, and nitriles) constitute preferred starting materials for the preparation of sulfitation products. Mono-olefinic compounds with between 10 and 30 carbon atoms in the molecule and mixtures thereof are particularly attractive materials for the preparation of such products.

The olefins may be straight chain olefins or secondary or tertiary branched chain olefins. Olefins containing a single non-aromatic ethylenic linkage are preferred but unsaturated organic compounds containing two or more such linkages, for instance diesters of dicarboxylic acids with unsaturated alcohols, may be used. The ethylenic linkages may be located in a terminal position or in an intermediate position.

The source of the olefin may be animal, vegetable or mineral. Thus, suitable olefins may be prepared by dehydrating alcohols obtained by hydrogenation of naturally-occurring fats and oils, such as tallow, palm oil, cocoanut oil, olive oil, or the corresponding free acids, or the olefins may be prepared by the Fischer-Tropsch synthesis or by cracking waxes or by cracking or dehydrogenating natural or synthetic (Fischer-Tropsch) petroleum or petroleum fractions or by halogenating and dehydrohalogenating such materials or by polymerizing low molecular weight olefins.

Olefinic mixtures containing olefins and non-olefinic hydrocarbons derived from natural or synthetic petroleum immediately or by thermolytic treatments constitute highly satisfactory initial materials for the preparation of nitrosyl chloride adducts. Thermolytic treatments which have been found to yield large proportions of suitable olefins are catalytic and non-catalytic cracking, catalytic dehydrogenation, and combinations thereof. Paraffinic, aromatic, or alicyclic hydrocarbons or other relatively inert diluent liquids, especially liquids which are solvents for the olefin or olefins being reacted, may be present during the formation of the nitrosyl chloride olefin adducts. Saturated aromatic constituents, to the extent they are acted upon by the nitrogen oxides, form active products which may be converted by alkali sulfite and bisulfite to water-soluble surface-active products. Since such materials may contribute substantially to the yield of valuable detergent products, the process of the invention is particularly advantageous for treating olefinic mixtures containing saturated aromatic constituents such as alkyl benzenes.

Examples of suitable olefins are cetene (derived from spermaceti and comprising for the most part cetene-1), 2-methyl-pentadecene-2, dodecene-1, pentadecene-7, tricosene-11, nondecene-9, 10-methyl nondecene-9, and olefin-containing, $C_{12}$–$C_{23}$ mixtures obtained by cracking topped, crude, natural or synthetic petroleum or by dehydrogenating a petroleum distillate, such as gas oil or by reacting carbon monoxide and hydrogen in the presence of a catalyst such as cobalt (the Fischer-Tropsch synthesis). Some synthetic petroleums contain relatively high proportions of olefins as compared with natural petroleum and hence are more suitable for use without a concentration or thermolysis to increase the olefin content.

Suitable substituted olefins are esters of unsaturated fatty acids such as acrylic acid and oleic acid, mono- and di-esters of maleic acid or mixtures such as the alkenyl succinic acid esters obtained by condensation of maleic anhydride with olefin fractions obtained by cracking or dehydrogenating natural or synthetic petroleum or by catalytic processes, such as the Fischer-Tropsch synthesis, and esterification of the unsaturated dicarboxylic acid anhydrides formed, with saturated mono-, di-, or trihydroxy alcohols, such as methanol, ethanol, propanol, isopropanol, the butanols and pentanols, glycol and glycerin and their homologs, lauryl alcohol, myristyl alcohol and cetyl alcohol; the esters of saturated fatty acids, such as acetic, lauric and stearic acids with unsaturated alcohols, such as allyl alcohol and its homologs; the mono-esters and the symmetrical and unsymmetrical di-esters of succinic acid with unsaturated alcohols or with an unsaturated alcohol on the one hand and a saturated alcohol on the other; the free oleic and alkenyl succinic acids and their alkali-metal salts and acid chlorides; the amides of saturated fatty acids and unsaturated amines; the amides of unsaturated fatty acids and amines, e. g. dimethyl amine, methyl butyl amine, ethyl butyl amine, etc.; and unsaturated ketones.

Specific examples of substituted olefins are butyl oleate, oleic acid, methyl oleate, isopropyl oleate, allyl stearate, allyl laurate, di-n-octyl (octenyl, nonenyl, decenyl, or undecenyl) succinate, oleic acid amide, N-methyl oleic acid amide, N-dimethyl oleic acid amide, oleic acid anhydride, oleic acid chloride, oleic acid nitrile, N-allyl lauric acid amide, N-oleyl butyric acid amide, N-methyl N-oleyl propionic acid amide, N-ethyl N-oleyl acetic acid amide, N-methyl N-lauryl 4-hexenoic acid amide, N-decyl 3-pentenoic acid amide, 3-methyl-4-dimethyl-cyclopentane-1-carboxylic acid ester of allyl alcohol, and oleone.

Examples of suitable unsaturated ring compounds are n-lauryl cyclohexene and $\Delta^2$-3-methyl-4-dimethyl-cyclopentene-1-carboxylic acid ester of butanol-1.

The following examples illustrate the process of the invention:

EXAMPLE 1

Nitrosation

To 1765 parts by weight of a dehydrogenated gas oil distillate fraction boiling in the range 100° to 225° C. at 10 mm. pressure and containing 241 parts olefins were added 234 parts by weight of a gas consisting of 218 parts NOCl and 16 parts $N_2O_4$ by weight (5 mol per cent $N_2O_4$). This gaseous mixture was introduced beneath the surface of the stirred olefin stock at an approximately uniform rate over a period of five hours during which time the reaction temperature was kept at 25° C. At the end of this time excess reagent was driven out from the nitrosation product by blowing the product with a stream of dry air. The resulting green oil was separated by decantation from 20 parts of gum formed in the process.

Sulfitation

The green oily nitrosation product was mixed with a sulfitation reagent comprising 378 parts $Na_2SO_3$, 104 parts $NaHSO_3$, 1260 parts $H_2O$, and 270 parts of 2-propanol. The mixture was agitated and heated gradually to 85° C. over a period of about one hour. It was then agitated at this temperature for the balance of a 24-hour heating period. At the end of the 24-hour period about an equal volume of water was added, stirring was discontinued, and the product was allowed to stratify. The aqueous phase was separated, extracted three times with ether to remove unreacted material and impurities, and the product recovered by evaporation of the water. A yield of water-soluble sulfitation product was secured corresponding to a conversion of about 70% of the olefinic ingredients of the oil employed. The product was an excellent detergent as measured by washing tests made on soiled pieces of wool. It was quite resistant to precipitation by the constituents of hard water. The product also showed good wetting, penetrating, foaming, emulsifying and dispersing qualities.

EXAMPLE 2

Part 1

A $C_{12-23}$ distillate containing 11.9% by weight of olefins averaging 17.2 carbon atoms per mol and derived from gas oil by dehydrogenation was gassed with NOCl for five hours at 25° C. During this period 3.5 mols of NOCl were introduced per mol of olefins in the distillate.

The nitrosation product, upon sulfitation as in Example 1, yielded 56 mol per cent (of the olefins) of water-soluble sulfonate detergent of good color and excellent cleansing ability.

Part 2

A second portion of the distillate was subjected to nitrosation employing 3.5 mols of a mixture comprising 95 mol per cent of NOCl and 5 mol per cent of $N_2O_4$ in place of the 3.5 mols of NOCl of Part 1 but otherwise like nitrosation conditions.

This nitrosation product upon sulfitation yielded 62 mol per cent, or an increase in yield of better than 10%, of water-soluble sulfonate detergent exhibiting a color equal to and a cleansing ability superior to that of the product of Part 1.

EXAMPLE 3

Part 1

A $C_{13-23}$ olefinic distillate derived from gas oil by dehydrogenation and containing 13.8 per cent by weight of olefins, averaging 17.4 carbon atoms per mol was gassed with NOCl for 5 hours at 25° C., 3 mols of NOCl per mol of olefin being introduced.

The nitrosation product upon sulfitation as in Example 1, yielded 63 mol per cent (of the olefins) of water-soluble detergent of good color and excellent cleansing ability.

Part 2

A second portion of the distillate was nitrosated as in Part 1 substituting for the 3 mols of NOCl, 3 mols of a mixture of 96 mol per cent NOCl and 4 mol per cent $N_2O_4$.

Upon sulfitation the nitrosation product yielded 77 mol per cent (an increase of more than 20%) of water-soluble detergent of good color and of cleansing ability nearly equal to that of the product of Part 1.

Part 3

A third portion of the distillate was nitrosated as in Part 1 substituting for the 3 mols of NOCl, 3 mols of a mixture of 89 mol per cent NOCl and 11 mol per cent $N_2O_4$.

Upon sulfitation the nitrosation product yielded 83 mol per cent (an increase of more than 30%) of water-soluble detergent of fair color and of cleansing ability equal to the product of Part 2.

Part 4

A fourth portion of the distillate was nitrosated as in Part 1 substituting for the 3 mols of NOCl, 3 mols of a mixture of 67 mol per cent NOCl and 33 mol per cent $N_2O_4$.

Upon sulfitation the nitrosation product yielded 92 mol per cent (an increase of nearly 50%) of water-soluble detergent which though inferior in color was superior in cleansing ability to the products of Parts 2 and 3.

I claim:

1. In the manufacture of nitrosyl chloride adducts of organic compounds containing at least one non-aromatic C=C linkage, the improvement which comprises reacting the organic compound with nitrosyl chloride containing, in admixture therewith, an oxide of the group consisting of nitrogen trioxide and nitrogen tetroxide in an amount at least sufficient to increase the yield of nitrosyl chloride adduct.

2. In the manufacture of nitrosyl chloride adducts of organic compounds containing at least one non-aromatic C=C linkage, the improvement which comprises reacting the organic compound with nitrosyl chloride containing, in admixture therewith, between 4 and 8 mols per cent of nitrogen tetroxide.

3. The method of making nitrosyl chloride adducts suitable for sulfitation to surface active products from organic compounds containing from 1 to 2 non-aromatic C=C linkages and between 10 and 30 carbon atoms per non-aromatic C=C linkage, which comprises reacting the organic compound at a temperature between 0° C. and 25° C. with nitrosyl chloride containing, in admixture therewith, between 4 and 8 mols per cent of nitrogen tetroxide.

4. The method of making nitrosyl chloride adducts suitable for sulfitation to surface active products from mono-olefins containing between 10 and 30 carbon atoms, which comprises introducing nitrosyl chloride containing, in admixture therewith, a minor proportion amounting to at least 4 mols per cent of nitrogen tetroxide into the mono-olefin maintained in liquid phase at a temperature below 80° C. until between 1¼ and 2 mols of nitrosyl chloride nitrogen oxide mixture have reacted per mol of said mono-olefin.

5. The method of making nitrosyl chloride adducts suitable for sulfitation to surface active products from organic compounds containing at least one non-aromatic C=C linkage and between 10 and 30 carbon atoms per non-aromatic C=C linkage with at least 8 of said carbon atoms of each 10 to 30 carbon atom group disposed as a continuous carbon chain, which comprises introducing nitrosyl chloride containing, in admixture therewith, a minor proportion amounting to at least 4 mols per cent of nitrogen tetroxide into the compound maintained in liquid phase at a reaction temperature below 80° C.

6. The method of making a nitrosyl chloride adduct suitable for sulfitation to surface active products from a mon-olefinic oil mixture the olefins of which consist essentially of hydrocarbons containing not less than 12 nor more than 23 carbon atoms per molecule, obtained by thermolytic treatment of petroleum, which method comprises reacting the olefinic oil mixture at a reaction temperature below 80° C. with nitrosyl chloride containing, in admixture therewith, a minor proportion amounting to at least 4 mols per cent cent of nitrogen tetroxide.

7. The method of making a nitrosyl chloride adduct suitable for sulfitation to surface active products from a mono-olefinic oil mixture the olefins of which consist essentially of hydrocarbons containing not less than 12 nor more than 23 carbon atoms per molecule, obtained by thermolytic treatment of petroleum, which method comprises introducing nitrosyl chloride containing, in admixture therewith, between 4 and 8 mols per cent of nitrogen tetroxide into the olefinic oil mixture maintained in liquid phase at a temperature between 0° C. and 25° C. until between 1¼ and 2 mols of nitrosyl chloride nitrogen oxide mixture have reacted per mol of mono-olefins in the mixture.

8. The method of making a nitrosyl chloride adduct suitable for sulfitation to surface active products from a mono-olefinic oil mixture containing alkyl aromatic constituents and the olefins of which consist essentially of hydrocarbons containing not less than 12 nor more than 23 carbon atoms per molecule, obtained by thermolytic treatment of petroleum, which method comprises introducing nitrosyl chloride containing, in admixture therewith, a minor proportion amounting to at least 4 mols per cent of an oxide of the group consisting of nitrogen trioxide and nitrogen tetroxide into the olefinic oil mixture maintained in liquid phase at a temperature between 0° C. and 25° C. until between 1¼ and 2 mols of nitrosyl chloride nitrogen oxide mixture have reacted per mol of mono-olefins in the mixture.

9. In the manufacture of nitrosyl chloride adducts of hydrocarbons containing one alkenyl radical and between 10 and 30 carbon atoms, the improvement which comprises introducing into a hydrocarbon of said type in liquid phase, nitrosyl chloride containing in admixture therewith a minor proportion amounting to at least 4 mols per cent of an oxide of the group consisting of nitrogen trioxide and nitrogen tetroxide.

HERMAN A. BEEKHUIS, JR.